Dec. 27, 1938.  A. D. SINGH  2,141,228
METHOD OF CONVERTING A SULPHITE INTO AN OXIDE AND SULPHUR DIOXIDE
Filed June 14, 1937
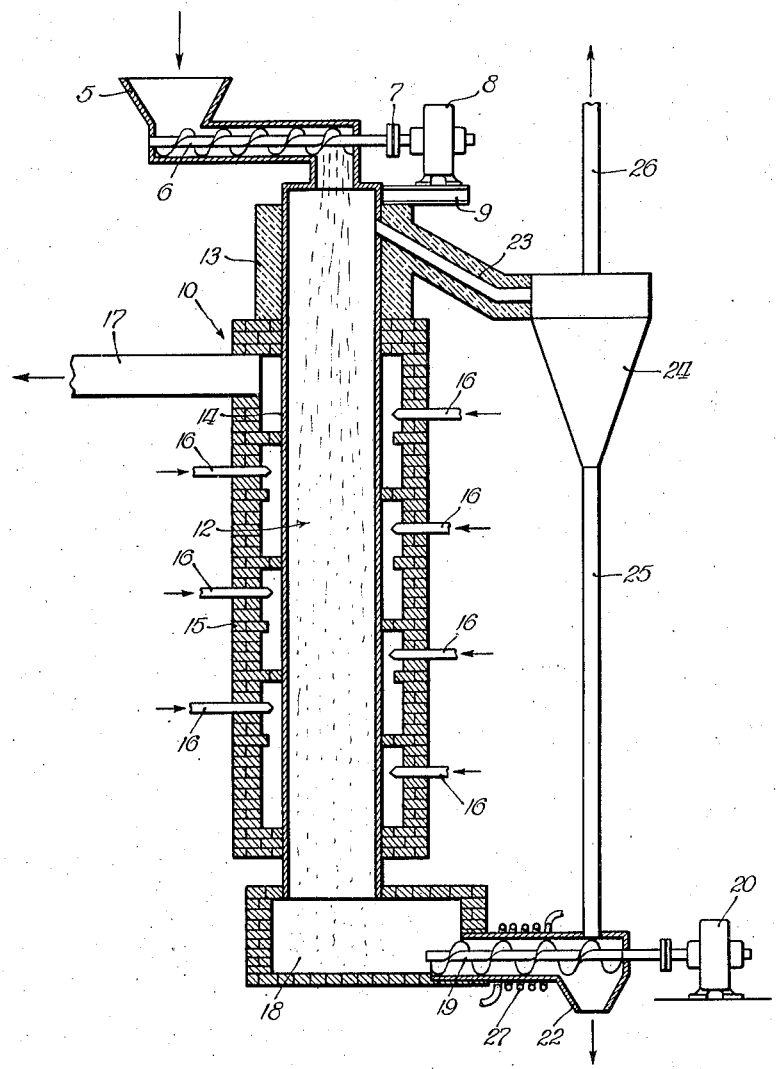
Inventor:
Alamjit D. Singh
By: [signature]
Attys.

Patented Dec. 27, 1938

2,141,228

UNITED STATES PATENT OFFICE 2,141,228

METHOD OF CONVERTING A SULPHITE INTO AN OXIDE AND SULPHUR DIOXIDE

Alamjit D. Singh, Urbana, Ill., assignor, by mesne assignments, to Commonwealth Edison Company, Chicago, Ill., a corporation of Illinois Application June 14, 1937, Serial No. 148,074

16 Claims. (Cl. 23—148)

This invention relates to a method of and means for converting a sulphite into an oxide and sulphur dioxide, and more particularly is directed to a calcination process employed in connection with the process for removal and recovery of sulphur dioxide from waste gases as more particularly described in the copending application of Henry F. Johnstone and myself, Serial No. 132,692, filed March 24, 1937.

The present process may be employed for cyclic regeneration of the metallic oxides used in removing the absorbed sulphur dioxide from the absorbing solution to regenerate this solution for further contact with the waste gases in the washing or scrubbing tower, and is described in connection with such a process, but the particular method of and means for regenerating the metallic oxide after it has been converted to a metallic sulphite is of course obviously applicable for use in other than the particular process described in the above-mentioned copending application.

One of the primary objects of the present invention is to provide a method of and means for producing a metallic oxide from an insoluble sulphite formed by treating a solution containing a soluble sulphite and bisulphite with the metallic oxide.

Another more specific object is to provide apparatus for decomposing zinc sulphite into zinc oxide and sulphur dioxide.

The apparatus commonly employed for calcination of this type consists of either externally heated rotary cylinders through which the material progresses, of stationary cylinders, also externally fired, but through which the decomposing material is conveyed by an internal spiral screw, or of externally heated stationary pans, provided with agitating means. The use of such equipment for decomposing the metallic sulphite is objectionable because of several difficulties inherent in the operation. In the first place, in addition to the main decomposition reaction into the oxide and sulphur dioxide, certain side reactions occur which result in the formation of sulphate and other sulphur compounds, the existence of which is undesirable because they are either decomposed with difficulty or because when they decompose they yield gases other than sulphur dioxide. This is particularly true of calcium and barium sulphite and others that decompose at high temperatures above 1000 degrees C. It is also true of magnesium sulphite, which decomposes at 500 degrees C., and to a less extent, of zinc sulphite which decomposes at 300 degrees C.

I have discovered that the reactions by which the sulphate is formed depend on a consecutive reaction between the hot oxide and the sulphur dioxide gas, and that the percentage of the sulphite converted into the sulphate can be materially decreased by increasing the rate of imparting heat to effect calcination and decreasing the time of contact between the hot oxide particles and the sulphur dioxide gas. For example, in a batch calcination of zinc sulphite at 475 degrees C., 96.97% of the sulphur dioxide was released in fifteen minutes, and 1.93% was converted to sulphate, the remaining sulphur dioxide existing as the residual undecomposed sulphite. In the atmosphere of sulphur dioxide created by the decomposition, after twenty minutes more at the same temperature the sulphate percentage increased to 4.09% of the original sulphur dioxide, while the residual sulphite was reduced to 0.01% of the original sulphur dioxide present in the solid. In ten more minutes the sulphate increased to 4.21% of the original sulphur dioxide. At 425 degrees C. the maximum percentage of sulphur dioxide released occurred, in these particular experiments, after thirty minutes. Larger intervals of calcination increased the percentage of sulphur dioxide converted to sulphate, which remained in the solid.

These experiments indicate the desirability of accomplishing the decomposition as rapidly as possible at a high temperature and of cooling the product from the calcination temperature immediately and removing it from contact with the gases of decomposition.

Another difficulty encountered in the calcination of sulphites, particularly those that are hydrated, is due to the tendency to become paste-like at temperatures below the decomposition temperature. Consequently, in any of the apparatus commonly used for calcinations, the solid material adheres to the wall of the container, to the stirrer arms, or to the screw conveyor, or agglomerates into large balls which decompose slowly.

A third difficulty in the calcination results from the great increase in volume of the solid, especially when the hydrated sulphites are decomposed. By hydrated sulphites is meant those that contain water of hydration in chemical combination with the sulphite molecule.

In an experimental study of the design of apparatus most suitable for the calcination of these sulphites I have found that the best results are produced by a method known as flash calcination. In this method, the solid is introduced into a vertical chamber, in subdivided form which may be defined as a suitably loose form of the material, such as granules, crystals, flakes, rod-like bodies, powder, loose particles or the like, of such character that the volume thereof will be increased during the first part of the decomposition to an extent that the resulting particles will be capable of being suspended in the gas in the chamber. The walls of the chamber are heated externally, by electricity, gas or other means. The temperature of the walls is maintained higher than the decomposition temperature, and at least high enough to cause them to glow. The heat transfer from the walls of the chamber is principally by radiation, and direct contact of the solid particles with the wall is unnecessary and undesirable. The heat required to raise the solid to the decomposition temperature and the latent heat of decomposition, therefore, are quickly transferred to the solid. The resulting oxide then falls from the furnace and is quickly cooled. Consequently there is little tendency for the particles to agglomerate or to adhere to the walls of the furnace. Furthermore, the formation of sulphate is materially decreased.

The time of exposure of the solid particles to the hot gases and to the radiating surface can be controlled by varying the length of the vertical heating chamber. Another method, however, which is more advantageous is by controlling the rate of feed per unit cross-sectional area of the heated chamber. Since the mass velocity of the sulphur dioxide released by the decomposition is proportional to the rate of feed, it is apparent that the rate of fall of the particles and thus the time of exposure to the radiating surface can be changed by changing the feed rate. The rate of heat input, of course, must be maintained in proportion to the feed rate, but this can be accomplished by control of the temperature of the radiating wall.

Either upward or downward flow of the gas may be used, depending upon the desired rate of fall of the solid.

In order to acquaint those skilled in the art with the particular details of construction and operation of a preferred form of the present invention, reference may be had to the accompanying drawing.

Referring now in detail to the drawing, in which the single figure illustrates a somewhat diagrammatic vertical sectional view through calcining apparatus for carrying out the present invention, the sulphite, which may be either the dry anhydrous salt, the dry hydrate, or even a slightly moist hydrate, is fed to the top of the calciner from a suitable hopper 5 by means of a suitable feed mechanism 6, such as a screw feed conveyor coupled, as at 7, to a suitable power driving mechanism, such as the motor 8, supported on the sills 9. In place of the screw conveyor 6, a belt conveyor may be employed if desired.

The heavy sulphite particles fall rapidly through the upper part of the calciner, indicated generally at 10, until they reach the radiating section, generally indicated at 12, where their rate of fall is arrested due to the swelling of the particles during decomposition. If the sulphur dioxide is to be drawn off at the top of the calciner, the upper part of the latter is insulated as indicated at 13 so that the temperature of the gas does not fall to the condensation point. By this means adherence of the solid particles to the walls is prevented.

The calciner itself comprises the vertical chamber 14, which may be fabricated from steel, alloy steel, or other suitable infusible material, and which extends downwardly through a heating furnace 15 built up of bricks or similar refractory material, and having at spaced intervals in the lateral surface thereof suitable heating means, such as gas jets indicated generally at 16, fed from a suitable source of gas supply and furnishing sufficient heat on the external surface of the cylinder 14 to cause the same to glow. This produces a relatively intense heat within the chamber. The exhaust for the hot products of combustion from the burners 16 is carried off through a suitable stack 17 positioned adjacent the top of the furnace construction 15.

A part of the solid resulting from the decomposition falls through the heated tube to a hopper or collecting chamber 18, from which it is continuously removed by means of the screw conveyor 19 coupled to a driving motor 20, or by any other suitable conveying means. From the conveyor, the recovered oxide is discharged through the port 22 to be returned for contact with the solution containing the soluble sulphite and bisulphite in order to convert the regenerated oxide back into the sulphite, after which it is again returned to the hopper 5 for regeneration. Preferably, suitable cooling means 27 is provided so that the hot oxide is cooled as it is withdrawn.

While the major portion of the solid resulting from the decomposition is collected in the chamber 18 and thence discharged to the other phase of the process, another portion of the solid is carried over with the sulphur dioxide gas released by the decomposition, through the conduit 23, which preferably is insulated so that the temperature of the gas does not fall to the condensation point, thereby preventing adherence of the solid particles to the wall. These particles which are carried over with the gas are separated from the sulphur dioxide gas in the separator 24, and discharged through the pipe 25 to the outlet of the conveyor 19, there being admixed with the solids collected from the chamber 18 for discharge into recontact with the absorbing solution. The gas is led off from the separator 24 through the conduit 26 to any suitable cooler or drying mechanism for purifying the gas or compressing and liquefying the same.

While the sulphur dioxide gas may be collected from the top of the chamber 12, it will be apparent that it may be withdrawn, instead, from the bottom of this chamber or from the chamber 18 as may be desired. When the sulphur dioxide is withdrawn from the bottom instead of from the top, less time for suspension of the sulphite particles is provided which may be desirable in some cases.

The material which is introduced through the conveyor 6 is in subdivided form, so that, by controlling the speed of the conveyor 6, an effective control of the rate of feeding may be effected. The rate, once it is fixed, should be uniform. The subdivision of the material supplied should be such that a substantially uniform rate of feeding is possible, (i. e., a substantially uniform stream of the material should be passed down the chamber 12). It should also be such that the material may be adequately penetrated by the heat of the wall 14 within the desired time of passage through the chamber 12. The totally or partially dried material may originally be of lumpy form. It may be directed through crushing rolls, grinders, or other means for effecting suitable subdivision. From the rolls or grinder it may enter the chamber 12. The shape of the solid particles, that is, whether granular, crystalline, rod-like, flakes, or other shapes, is not material, except that they must be capable of being suspended in the gas in the chamber 12 after the initial decomposition has set in. Within limits, these particles may vary in size but not so much as substantially to vary the rate of feeding, or of heat penetration.

It therefore appears that I have provided a novel method of and means for converting an insoluble sulphite into a metallic oxide and sulphur dioxide, which will accomplish the calcination in such manner as to avoid the undesirable secondary reactions and also to prevent the agglomeration of the solid particles upon adjacent surfaces or the like. Further, by the present process, the temperature of the walls confining the material to be decomposed is maintained higher than the decomposition temperature, and at least sufficiently high to cause them to glow, whereby the heat transfer from the walls of the chamber is principally by radiation, and no direct contact of the solid particles with the wall is necessary. By suitable control means connected with the motors 8 and 20, the rate of feed of the material per unit cross-sectional area of the heated chamber can be accurately controlled so that the rate of exposure of the solid particles to the hot gases and to the radiating surface can be controlled without changing the length of the vertical heated chamber, although this latter method of control may be employed if desired. The rate of heat input is, of course, maintained in proportion to the feed rate by any suitable mechanism, such as thermostatic means or the like, which will control the temperature of the radiating wall.

When zinc sulphite is processed, as herein disclosed, to convert the same into zinc oxide and sulphur dioxide, the zinc oxide is produced in extremely fine particles so that it is quite reactive. Its relatively low density and large percentage of void space cause it to have very low heat conductivity and, therefore, it is especially adapted for use as a heat insulating material. For example, it could be used to fill the spaces between the inner and outer walls of buildings. If used for such purpose, the zinc oxide would not be returned to the solution containing the soluble sulphite and disulphite, but would be otherwise suitably processed.

I am aware that various changes and modifications of the particular apparatus disclosed herein may be made without departing from the principles underlying the present invention, and I therefore do not intend to be limited except as defined by the scope and spirit of the appended claims.

I claim:

1. A method of converting a sulphite into an oxide and sulphur dioxide which comprises introducing the sulphite in subdivided form into the top of a vertical chamber having walls suitable for radiating heat at such a rate as to effect substantially complete decomposition thereof, withdrawing the major portion of the hot oxide from the bottom of the chamber, withdrawing the remainder of said oxide and the sulphur dioxide gas adjacent the top of the chamber, separating said gas from said portion of oxide, and combining the portions of withdrawn oxides.

2. A method of converting a sulphite into an oxide and sulphur dioxide which comprises introducing the sulphite into the top of a vertical chamber, maintaining the walls of said chamber at a temperature sufficient to effect substantially complete decomposition before said sulphite falls to the bottom thereof, withdrawing the hot oxide from the bottom of said chamber and cooling the same.

3. A method of converting a sulphite into an oxide and sulphur dioxide which comprises introducing the sulphite into the top of a vertical chamber, maintaining the walls of said chamber at a temperature sufficient to effect substantially complete decomposition of said sulphite before it reaches the bottom thereof, discharging the gases released by said decomposition adjacent the top of said chamber, withdrawing the hot oxide from the bottom of said chamber and cooling the same.

4. A method of converting a sulphite into an oxide and sulphur dioxide which comprises introducing the sulphite in subdivided form into the top of a vertical chamber having walls suitable for radiating heat, retarding the fall of the particles of the material by the sulphur dioxide gas released by decomposition thereof so that the time of exposure of the particles to the radiating surface is sufficient to effect substantially complete decomposition thereof, and withdrawing the sulphur dioxide gas from the chamber adjacent the top thereof.

5. A method of converting a sulphite into an oxide and sulphur dioxide which comprises introducing the sulphite in subdivided form comprising particles into the top of a vertical chamber having walls suitable for radiating heat, retarding the fall of said particles by the sulphur dioxide gas released by decomposition thereof so that the time of exposure of the particles to the radiating surface is sufficient to effect substantially complete decomposition thereof, withdrawing the sulphur dioxide gas from the chamber adjacent the top thereof, and insulating the chamber about said point of withdrawal of said gas to avoid condensation of water and agglomeration of the sulphite particles entering said chamber.

6. A method of converting a sulphite into an oxide and sulphur dioxide which comprises introducing the sulphite into the top of a vertical chamber, maintaining the walls of said chamber at a temperature sufficient to effect substantially complete decomposition of said sulphite, withdrawing the major portion of the hot oxide from the bottom of the chamber, withdrawing the sulphur dioxide with a portion of the suspended oxide therein from the top of the chamber, separating the said latter portion of the oxide from the sulphur dioxide, and cooling both portions of the withdrawn oxide.

7. A method of converting a sulphite into an oxide and sulphur dioxide which comprises introducing the sulphite subdivided in the form of particles into the top of a vertical chamber having walls suitable for radiating heat, retarding the fall of said particles by the sulphur dioxide gas released by decomposition thereof so that the time of exposure of the particles to the radiating surface is sufficient to effect substantially complete decomposition thereof, and withdrawing the sulphur dioxide gas from the chamber adjacent the top thereof while maintaining the temperature of the gas above the temperature of condensation.

8. A method of converting zinc sulphite into zinc oxide and sulphur dioxide which comprises introducing the sulphite into the top of a vertical chamber, maintaining the walls of the chamber at a temperature sufficient to effect decomposition of the sulphite in its movement through said chamber to insure substantially complete decomposition before they reach the bottom of the chamber, and withdrawing the zinc oxide from the bottom of said chamber and cooling the same.

9. A method of converting magnesium sulphite into magnesium oxide and sulphur dioxide which comprises introducing the magnesium sulphite into the top of a vertical chamber, maintaining the walls of the chamber at a temperature sufficient to effect decomposition of the magnesium sulphite in its movement through said chamber to insure substantially complete decomposition before they reach the bottom of the chamber, and withdrawing the hot magesium oxide from the bottom of said chamber and cooling the same.

10. A method of converting a sulphite consisting of one of the following group: calcium, barium, strontium, lead, or cadmium, into the corresponding oxide and sulphur dioxide, which comprises introducing the sulphite into the top of a vertical chamber, maintaining the walls of said chamber at a temperature sufficient to effect substantially complete decomposition before said sulphite falls to the bottom thereof, and withdrawing the hot oxide from the bottom of said chamber and cooling the same.

11. A method of converting a metal sulphite into a metal oxide and sulphur dioxide which comprises introducing the sulphite subdivided in the form of particles into the top of a vertical chamber having walls suitable for radiating heat, controlling the rate of feed of said particles per unit cross-sectional area of said chamber to effect substantially complete decomposition thereof within the length of said chamber, withdrawing the major portion of the hot oxide from the bottom of said chamber, withdrawing the remainder of said oxide and the sulphur dioxide gas adjacent the top of said chamber, separating said gas from said portion of oxide, and combining the portions of withdrawn oxide.

12. A method of converting a sulphite into an oxide and sulphur dioxide which comprises introducing the sulphite suitably subdivided in the form of particles into the top of a vertical chamber having walls suitable for radiating heat, proportioning the length of said chamber to the temperature maintained therein to effect substantially complete decomposition of said particles, withdrawing the major portion of the hot oxide from the bottom of the chamber, withdrawing the remainder of said oxide and the sulphur dioxide gas from adjacent the top of said chamber separating said gas from said portion of oxide, and combining the portions of withdrawn oxide.

13. In a process of converting a sulphite into an oxide and sulphur dioxide in which particles of the sulphite are introduced into the top of a vertical chamber having metallic walls suitable for radiating heat, the novel procedure which comprises externally heating said walls to such a temperature whereby the particles are decomposed in said chamber independently of contact with said walls, producing an upward flow of the sulphur dioxide gas released by said decomposition whereby the rate of fall of said particles is controlled to effect substantially complete decomposition thereof during fall through said chamber, withdrawing the hot oxide from the bottom of said chamber, and withdrawing the sulphur dioxide gas from adjacent the top of said chamber.

14. Method of producing zinc oxide having relatively high chemical reactivity and relatively low heat conductivity which comprises introducing zinc sulphite in finely divided form into the top of a vertical chamber, applying radiated heat from the inner walls of the chamber to decompose the particles of sulphite into zinc oxide and sulphur dioxide gas while the particles are suspended in the gas, and collecting the zinc oxide at the bottom of the chamber.

15. A method of converting a sulphite into an oxide and sulphur dioxide which comprises introducing the sulphite in finely divided form into the top of a vertical chamber, and causing the inner walls of the chamber to radiate sufficient heat to decompose the particles of sulphite while the same are passing through sulphur dioxide gas in the chamber, the rate of fall of the sulphite particles through the chamber being such that they are substantially completely decomposed by the radiated heat from the inner walls of the chamber.

16. A method of converting a sulphite into an oxide and sulphur dioxide which comprises introducing the sulphite in finely divided form into the top of a vertical chamber, causing the inner walls of the chamber to radiate sufficient heat to decompose the particles of sulphite while the same are passing through sulphur dioxide gas in the chamber, the rate of fall of the sulphite particles through the chamber being such that they are substantially completely decomposed by the radiated heat from the inner walls of the chamber, and withdrawing the sulphur dioxide gas from the lower portion of the chamber.

ALAMJIT D. SINGH.